April 28, 1970 W. K. COLVILLE 3,508,786
REMOVABLE PASSENGER ENCLOSURE FOR PICKUP TRUCK
Filed Dec. 5, 1968 2 Sheets-Sheet 1

INVENTOR
WILLIAM K. COLVILLE
BY KENDRICK and SUBKOW
George J. Netter
ATTORNEYS

April 28, 1970      W. K. COLVILLE      3,508,786

REMOVABLE PASSENGER ENCLOSURE FOR PICKUP TRUCK

Filed Dec. 5, 1968      2 Sheets-Sheet 2

INVENTOR
WILLIAM K. COLVILLE
BY KENDRICK and SUBKOW

George J. Netter
ATTORNEYS

United States Patent Office 3,508,786
Patented Apr. 28, 1970

3,508,786
REMOVABLE PASSENGER ENCLOSURE FOR PICKUP TRUCK
William K. Colville, Los Angeles, Calif.
(7954 McGroarty St., Sunland, Calif. 91040)
Filed Dec. 5, 1968, Ser. No. 781,329
Int. Cl. B60j 7/00
U.S. Cl. 296—99                                         4 Claims

ABSTRACT OF THE DISCLOSURE

A removable enclosure adapted to be installed in the front end of the cargo compartment of a conventional pickup truck. The rear window is removed from the truck cab when the enclosure is installed in place, and the enclosure includes a front wall disposed adjacent the rear cab wall and having an opening of substantially the same configuration as the rear cab window opening and aligned therewith, thereby providing access to the interior of the enclosure through the rear cab window opening. A rubber ring is clamped in place between the rear cab window opening and the front enclosure opening to seal the enclosure and cab against the elements.

The enclosure is anchored in the forward end of the cargo compartment by a series of bolts extending between the floor of the enclosure and the floor of the cargo compartment, and handles are provided on the side walls of the enclosure for facilitating installation and removal thereof. A convertible seat-bed is provided in the enclosure for accommodating one or more passengers.

The enclosure occupies only a relatively small portion of the front end of the truck cargo compartment, thereby leaving the rear portion of the cargo compartment open for carrying luggage and/or other equipment.

BACKGROUND OF THE INVENTION

The present invention relates to an improved removable enclosure adapted to fit in the front end of the cargo compartment of a pickup truck for increasing the passenger-carrying capacity of the truck.

Numerous campers, tonneaus and the like have been designed for installation in the cargo compartments of pickup trucks for accommodating passengers. For example, such a tonneau is shown in U.S. Patent No. 2,559,029.

Unfortunately, all of these prior art campers and tonneaus are large, awkward to handle, difficult to install and remove in the trucks, and fully occupy the cargo compartments when installed.

It is an object of the present invention to provide an improved removable enclosure which is relatively inexpensive, easy to install and remove, and occupies only the forward portion of the cargo compartment of a pickup truck, thereby leaving the rear portion open for carrying cargo.

DESCRIPTION OF THE PREFERRED EMBODIMENT

Figure 1:
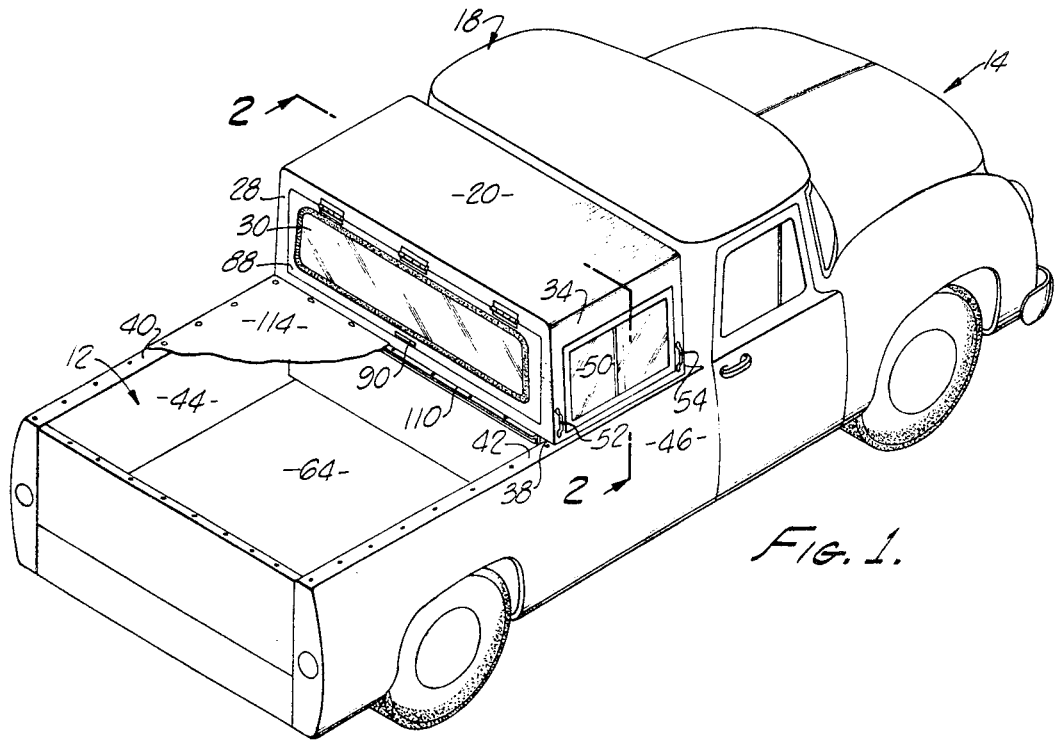
FIGURE 1 is a perspective view showing the removable enclosure of the present invention installed in a conventional pickup truck.
Figure 2:
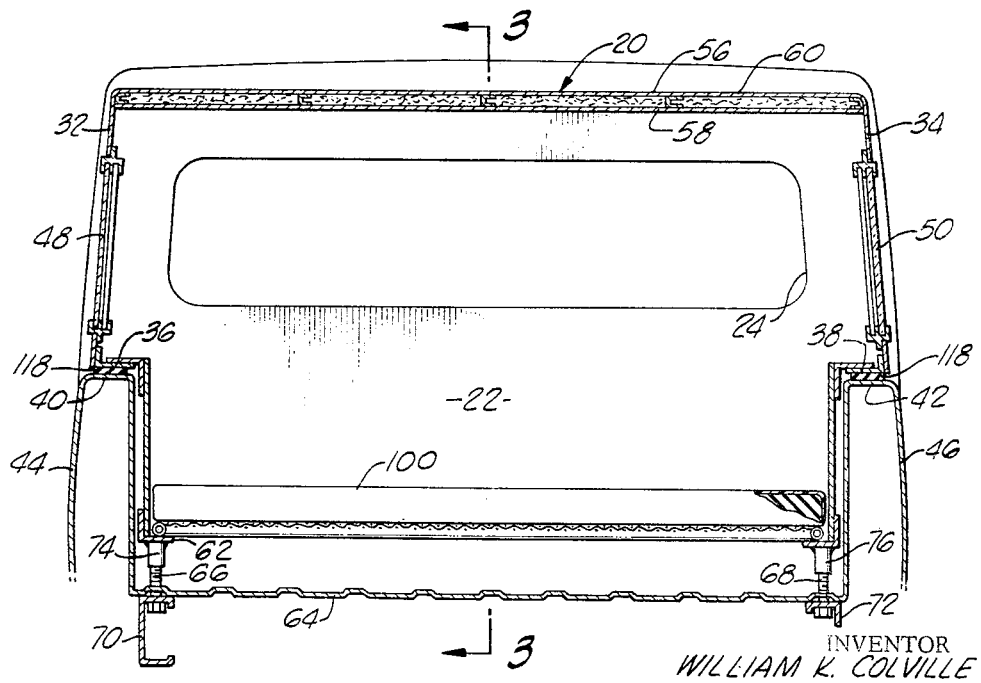
FIGURE 2 is a sectional elevation view of the enclosure and truck taken along the plane 2—2 of FIGURE 1 and looking in the direction of the arrows.
Figure 3:
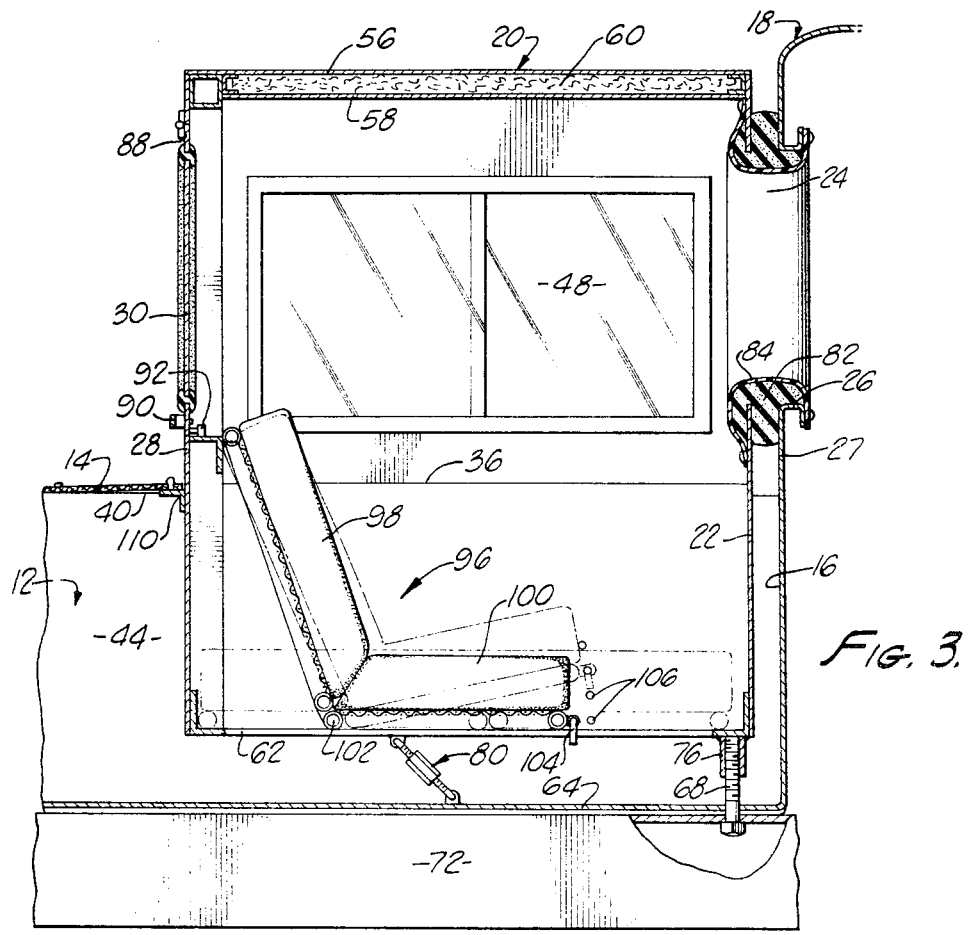
FIGURE 3 is a sectional side elevation view of the enclosure taken along the plane 3—3 of FIGURE 2 and looking in the direction of the arrows.

As shown in the drawings, the removable enclosure 10 of the present invention is designed to fit in the forward end of the cargo compartment 12 of a conventional pickup truck 14 adjacent the rear wall 16 of the truck cab 18. As best shown in FIGURES 2 and 3, the enclosure 10 comprises a roof 20, a front wall 22 having an opening 24 therein of the same general configuration as the window opening 26 in the rear wall 27 of the truck cab 18, and a rear wall 28 having a window 30 therein. As best shown in FIGURE 2, the enclosure 10 further comprises a pair of side walls 32, 34 which are stepped to provide ledges 36, 38 for supporting the enclosure on the upper edges 40, 42 of the side walls 44, 46 of the truck cargo compartment 12. The upper portions of the enclosure side walls 32, 34 are provided with sliding windows 48, 50 and handles 52, 54 for facilitating installation and removal of the enclosure. The enclosure roof 20 comprises a pair of spaced panels 56, 58 filled with insulation 60 (FIGURE 2).

The enclosure 10 further comprises a frame 62 which is securely anchored to the floor 64 of the cargo compartment 12 by means of bolts 66, 68 which extend through angle irons 70, 72 on the bottom of the cargo compartment floor and through the floor into threaded sleeves 74, 76 which are mounted on the bottom of the enclosure floor, panel 62. One or more tension bolt assemblies 80 (FIGURE 3), conventional per se, are also provided for anchoring the enclosure to the cargo compartment floor 64 and maintaining the enclosure in the forward end of the compartment.

Access to the interior of the enclosure 10 may be had through the rear window opening 26 of the truck cab 18 (the rear window, not shown, is removed) and the opening 24 in the forward wall 22 of the enclosure. The enclosure opening 24 is of the same configuration as the rear cab window opening 26 and the two openings are aligned when the enclosure is installed in the truck, as shown in FIGURE 3. A ring 82 of rubber or other suitable material is secured between the rear cab window opening 26 and the enclosure opening 24 to seal the juncture and prevent wind, rain, etc., from entering the cab or enclosure. The rubber ring 82 also functions as a cushion to prevent impact between the cab and enclosure. The rubber ring 82 is held in place by an annular boot 84 which clamps over the peripheral edges of the rear cab window opening and the enclosure opening and is bolted or otherwise suitably secured in place (FIGURE 3).

Access to the interior of the enclosure 10 may also be had through the rear wall 28 thereof. To this end, a door 88 having handle 90 and conventional lock mechanism 92 is provided in the rear wall 28.

Figure 4:
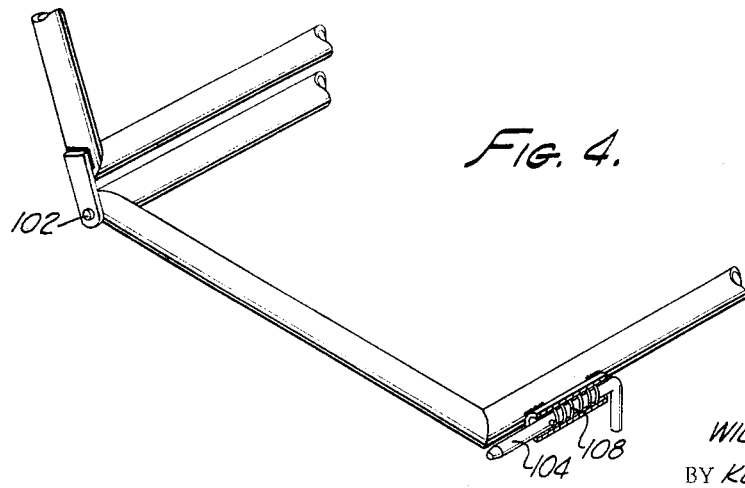
FIGURE 4 is a partial perspective view of a portion of the frame of a convertible seat-bed assembly which may be installed in the enclosure.

As best shown in FIGURES 3 and 4, a seat 96 which converts into a bed is provided in the enclosure 10. The seat 96 comprises a back portion 98 and seat portion 100 which are pivotally connected to one another at 102. A pin 104 is slidably mounted on the forward edge of the seat portion 100 and is spring loaded so as to be normally engaged in one of a series of apertures 106 provided in the enclosure side wall 32 adjacent the floor. When it is desired to convert the seat into a bed, the pin 104 is pulled away from the aperture 106 against the force of the spring 108, and the seat frame is slid forwardly, whereupon the back portion of the seat will drop to a horizontal position to provide a bed, as best shown in FIGURES 3 and 4.

Since the enclosure 10 occupies only the forwardmost portion of the truck cargo compartment, the rear portion thereof may be employed to haul luggage, equipment or other cargo when the enclosure is installed. As shown in FIGURE 3, an angle iron 110 is mounted across the rear wall 28 of the enclosure 10, generally in the plane of the upper edges 40, 42 of the cargo compartment side and end walls 44, 46, 47. Fasteners 112 are mounted on the angle iron 110 and on the upper side and end wall edges for holding a cover 114 in place over the rear portion of the cargo compartment.

To install the enclosure 10 in the truck cargo compartment 12, two persons simply lift the enclosure from either side thereof by means of handles 52, 54, and set it in the forward end of the compartment 12 so that the ledges 36, 38 will rest on the upper edges of the side walls 44, 46 and the rubber ring 82 presses against the rear cab wall 16 around the window opening 26. Suitable pads 118 (FIGURE 2) may be provided between the ledges 36, 38 and the upper edges 40, 42 of the compartment side walls. The enclosure is then anchored to the cargo compartment floor 64 by means of bolts 66, 68, 80 and the boot 84 is mounted over the rubber ring 82 and the peripheral edges of aligned openings 24 and 26.

As noted above, access to the enclosure 10 may be had through the aligned openings 24, 26 or through the door 88 in the rear enclosure wall 28. Luggage and/or other equipment (not shown) may then be loaded in the rear portion of the cargo compartment, and the cover 114 may be fastened in place.

To remove the enclosure 10, it is only necessary to detach the boot 84 and remove the bolts 66, 68, 80 which anchor the enclosure to the cargo compartment floor. The pickup truck may then be used in the conventional manner.

I claim:

1. In combination:
   a pickup truck comprising a cab and a rearwardly extending cargo compartment;
   said cab comprising a rear wall having means defining a window opening therein;
   said cargo compartment being defined by a horizontally extending floor panel, said rear cab wall, a pair of upstanding side walls having horizontally extending upper edges, and a rear wall spaced from said rear cab wall by a fixed length comprising the length of said cargo compartment; and
   a removable passenger-carrying enclosure;
   said enclosure comprising a roof panel, a floor panel an upstanding front wall, an upstanding rear wall, and a pair of upstanding side walls;
   each of said enclosure side walls comprising a lower portion located inwardly of a cargo compartment side wall and of vertical extent less than said side wall, an upper portion connected to the roof panel and located outwardly of a cargo compartment side wall, and a generally horizontal ledge member interconnecting said enclosure side wall upper and lower portions, said ledge members resting respectively on the cargo compartment side wall upper edges thereby supporting the enclosure floor panel in spaced relation to the cargo compartment floor panel;
   first threaded means detachably connecting said enclosure floor panel to said cargo compartment floor panel for providing a securing force substantially normal to said panels;
   second threaded means interconnecting the enclosure floor panel and said cargo compartment floor panel for providing a securing force to said floor panels, a component of which force urges the enclosure floor panel toward the cab;
   means defining an opening in said front wall of said enclosure in substantial alignment with said window opening in said rear cab wall;
   a ring of soft rubber material disposed between and connected to said rear cab wall and said enslosure front wall adjacent said aligned openings therein;
   said rear wall of said enclosure being spaced from said rear wall of said cargo compartment to define cargo carrying space therebetween.

2. The combination according to claim 1, wherein said rear wall of said enclosure includes a pivotally mounted door permitting access to the interior of said enclosure.

3. The combinaiton according to claim 1, and further comprising a convertible seat-bed structure mounted on the enclosure floor.

4. In combination:
   a pickup truck comprising a cab and a rearwardly extending cargo compartment;
   said cab comprising a rear wall having means defining a window opening therein;
   said cargo compartment being defined by a horizontally extending floor panel, said rear cab wall, a pair of upstanding side walls having horizontally extending upper edges, and a rear wall spaced from said rear cab wall by a fixed length comprising the length of said cargo compartment; and
   a removable passenger-carrying enclosure;
   said enclosure comprising a roof panel, a floor panel, an upstanding front wall, an upstanding rear wall, and a pair of upstanding side walls;
   each of said enclosure side walls comprising a lower portion located inwardly of a cargo compartment side wall and of vertical extent less than said side wall, an upper portion connected to the roof panel and located outwardly of a cargo compartment side wall, and a generally horizontal ledge member interconnecting said enclosure side wall upper and lower portions, said ledge members resting respectively on the cargo compartment side wall upper edges thereby supporting the enclosure floor panel in spaced relation to the cargo compartment floor panel;
   first threaded means detachably connecting said enclosure floor panel to said cargo compartment floor panel for providing a securing force substantially normal to said panels;
   second threaded means interconnecting the enclosure floor panel and said cargo compartment floor panel for providing a securing force to said floor panels, a component of which force urges the enclosure floor panel toward the cab;
   means defining an opening in said front wall of said enclosure in substantial alignment with said window opening in said rear cab wall.

References Cited
UNITED STATES PATENTS

| | | | |
|---|---|---|---|
| 1,632,672 | 6/1927 | Obergfell | 296—99 |
| 1,780,277 | 11/1930 | Seeley | 280—179 |
| 2,559,029 | 7/1951 | Randolph | 296—23 |
| 3,066,974 | 12/1962 | Ambli | 296—100 |
| 3,169,792 | 2/1965 | Solano-Viquez | 296—99 |
| 3,249,382 | 5/1966 | Swithenbank | 296—26 |

LEO FRIAGLIA, Primary Examiner

R. R. SONG, Assistant Examiner

U.S. Cl. X.R.
280—179; 296—26